March 9, 1937. A. E. ALDERMAN Re. 20,281

COMBINED CAMERA AND ILLUMINATOR

Original Filed Nov. 4, 1933 2 Sheets-Sheet 1

Witness
H. Woodard

Inventor
A. E. Alderman

By H. B. Willson & Co
Attorneys.

March 9, 1937. A. E. ALDERMAN Re. 20,281

COMBINED CAMERA AND ILLUMINATOR

Original Filed Nov. 4, 1933 2 Sheets-Sheet 2

Inventor

A. E. Alderman

Witness

H. Woodard

By H. B. Willson & Co

Attorneys.

Reissued Mar. 9, 1937

Re. 20,281

UNITED STATES PATENT OFFICE 20,281

COMBINED CAMERA AND ILLUMINATOR

Alonzo E. Alderman, Washington, D. C., assignor to Burton Manufacturing Company, Inc., Chicago, Ill., a corporation of Illinois Original No. 1,960,722, dated May 29, 1934, Serial No. 696,736, November 4, 1933. Application for reissue May 19, 1936, Serial No. 80,612

14 Claims. (Cl. 240—2)

The invention aims to provide a unique, compact, convenient and efficient device for taking sharply defined photographs at close range, for instance, photos of diseased parts of the human body, for physicians', surgeons', dentists' and lecturers' use. For such purposes, illumination of the subject is an all important factor and requires a flash of light at the instant of making the exposure. Heretofore, it has been most difficult to provide for flash illumination which will not cast such shadows upon the subject as to produce a very indistinct photograph. Then too, the taking of color photographs with flash illumination, has previously met with little success. Due to the nature of my invention, however, such uniform flash illumination is attained, that sharply defined photographs may be taken, even in colors, and for records of disease treatment and for classroom instruction, only color photographs will adequately suffice.

Other drawbacks which have heretofore existed in the taking of flashlight photographs, are the inconvenience of carrying various accessories from place to place and the difficulty of properly pre-arranging the illuminating means, connecting wires with base sockets, lamp sockets, etc. Such drawbacks, however, are effectively overcome by the present invention in which all necessary equipment is embodied in a single light and compact unit.

Figure 4 is a vertical sectional view on line 4—4 of Figure 3.

Figure 5 is a detail vertical sectional view substantially on line 5—5 of Figure 4 but showing a number of parts in elevation.

Figure 6 is a detail perspective view of the means under a single control for actuating the camera shutter and closing a circuit to operate the flash bulb.

Figure 1:
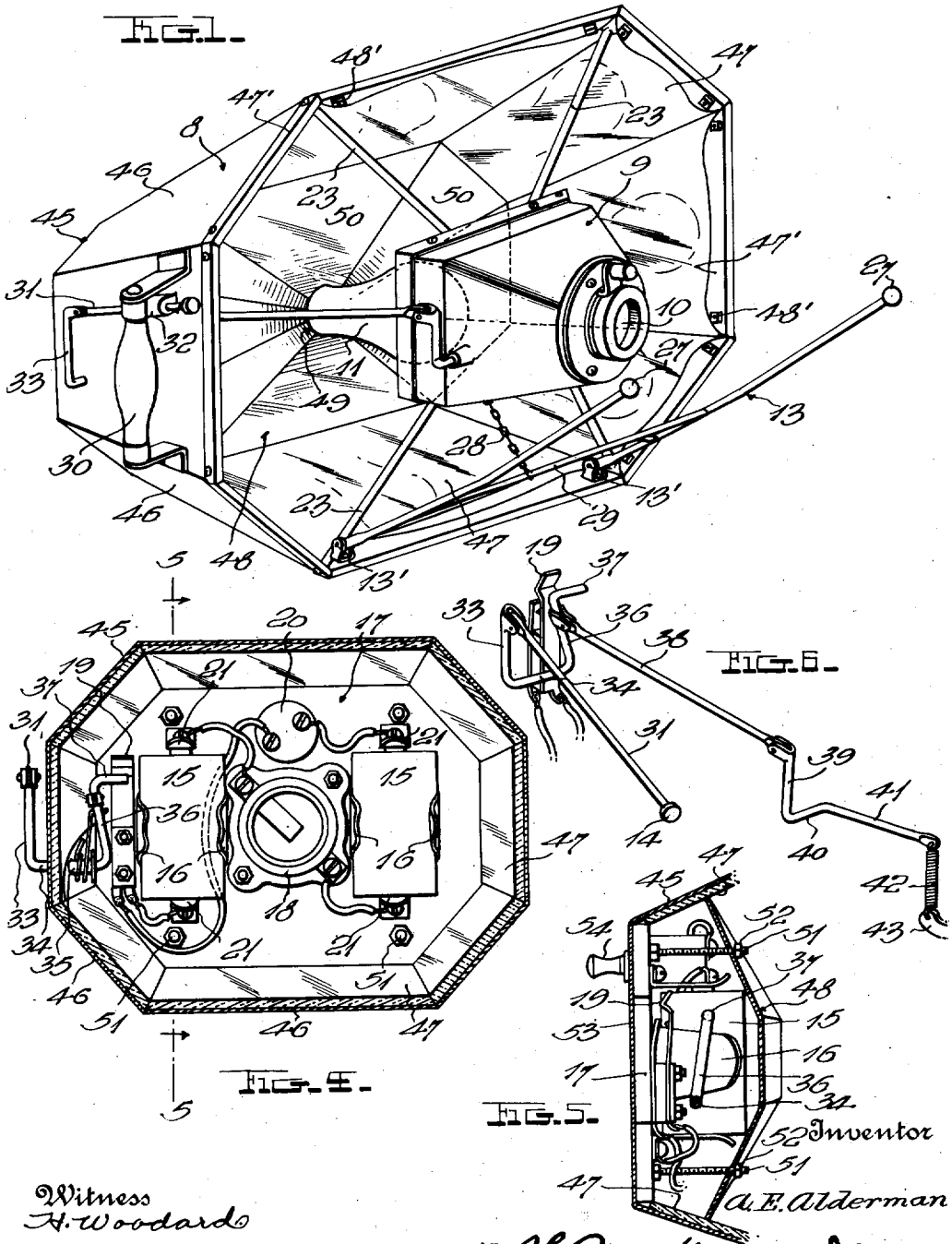
Figure 1 is a perspective view showing a combined camera and illuminator constructed in accordance with the invention.
Figure 2:
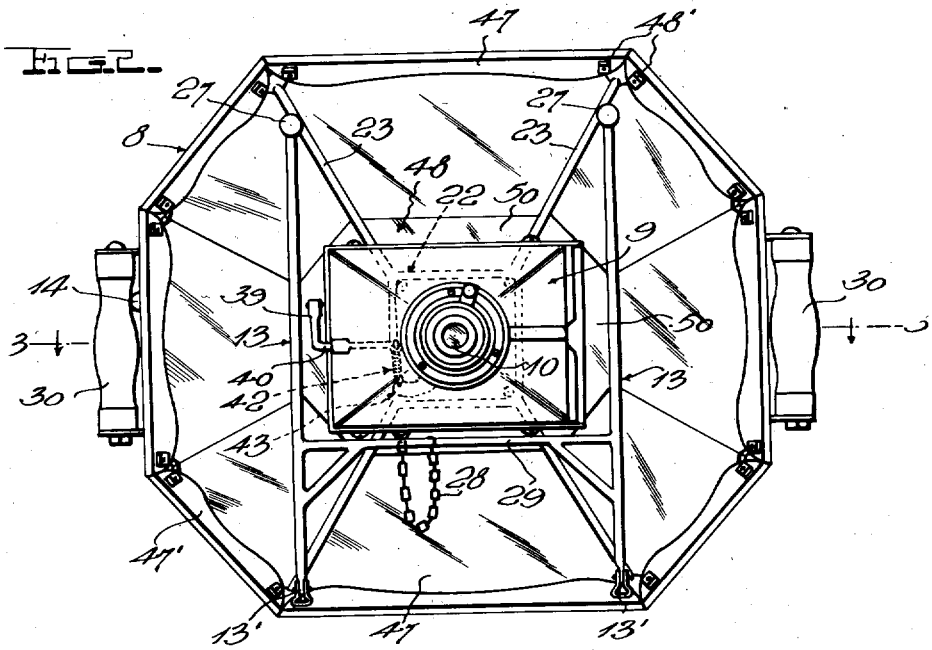
Figure 2 is a front elevation.
Figure 3:
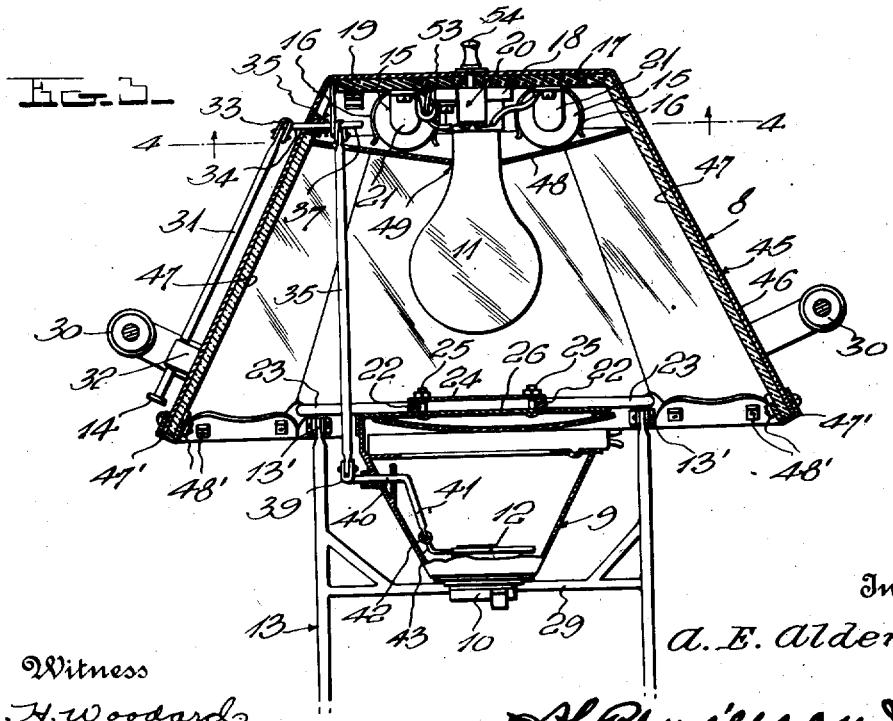
Figure 3 is a horizontal sectional view on line 3—3 of Figure 2.

A preferred construction has been shown and will be specifically described, with the understanding however, that numerous variations may be made within the scope of the invention as claimed.

A bowl-like reflector 8 is provided, a photographic camera 9 is centrally mounted at the open front of said reflector, the camera lens 10 being presented away from said reflector, an illuminating bulb 11, preferably a flash bulb, is centrally mounted in the rear portion of the reflector 8 directly behind the camera 9, and means are provided, under a single manual control, for operating the camera shutter 12 and closing a circuit for the bulb 11. The light from this bulb is concentrated by the reflector 8 upon the zone to be photographed and the illumination is effected so uniformly that the photograph will be free from obscuring shadows.

The camera 9 is preferably of fixed focus, and to properly space it from the subject, I provide a spacing device 13 which is pivoted at 13' to the reflector 8, said spacing device being swingable forwardly to an operative position at which it may abut the subject, and being swingable rearwardly, when not in use, into compact relation with said reflector. Difficulties with regard to proper focusing of the camera are thus overcome and by using a bulb 11 of the same strength each time a photograph is to be taken, it is insured that the proper relation between illumination and camera focus shall exist. Moreover, the camera shutter 12 is preferably of such type that its degree of opening cannot be varied, so that by simply pressing the control button 14 and instantaneously releasing it, the same exposure will be made in all cases. There are thus no details for the photographer to contend with, it being simply necessary that he properly space the device from the subject with the aid of the spacer 13 and that he then press the control 14.

In order that it may not be necessary to connect any current supply wires with base sockets, lamp sockets or the like in the room in which the exposure is to be made, a battery is preferably unitarily assembled with the rest of the apparatus, for supplying the necessary current to illuminate the bulb 11. In the present showing, the battery consists of two cells 15 held by spring clips 16 which are carried by an insulating base 17. Upon this insulating base, the socket 18 for the bulb 11, is mounted, together with a switch 19 for completing a circuit for said bulb, and a safety switch 20. The latter remains normally open to prevent possible flashing of the bulb 11 before the desired time, due to any accidental pressing of the control 14, and is closed immediately before the exposure is to be made. Spring contacts 21 are preferably mounted on the base 17 to engage the terminals of the cells 15, and any adequate conducting means may operatively connect these contacts with the switches 19 and 20, and the socket 18.

A mount for the camera 9 serves also as a reinforcing means for the open front of the reflector 8, preventing possible distortion of the latter. In the present showing, the mount comprises a rectangular frame 22 having radiating arms 23, the outer ends of the latter being suitably secured to the reflector. I have shown a plate 24 lying against the rear side of the frame 22, and bolts 25 in the four corners of said frame, said bolts passing through said plate 24 and through the rear wall 26 of the camera 9.

The spacer 13 is preferably in the form of an H-shaped frame, the side members of said frame being pivotally mounted at 13', at one end, and being provided with balls or the like 27 at their other ends, to contact with the subject to be photographed. A chain or the like 28 may well connect at one end with the cross bar 29 of this frame and connect at its other end to the camera or camera support to limit the forward projection of the spacer, as seen in Figure 1.

For convenient handling and holding, the reflector 8 is provided with two hand-grips 30 disposed at its opposite sides, and the control 14 is adjacent one of these hand-grips to be easily operated with one finger. This control is preferably in the form of a push button on the front end of a rod 31 disposed at the exterior of the reflector 8, the front portion of this rod being guided in a suitable bearing 32 while its rear end is pivoted to an upstanding arm 33 on a rock shaft 34 which passes through the reflector side wall and is mounted in an appropriate bearing 35. Rock shaft 34 is provided with another upstanding crank arm 36 having a lateral finger 37 to close the switch 19. Pivoted to and extending forwardly from the crank arm 36, is another rod 38 connected with an upstanding crank arm 39 on a rock shaft 40 which extends to the interior of the camera 9, said rock shaft 40 being provided with a forwardly projecting crank arm 41 connected by a coiled spring or the like 42 with the operating arm 43 of the shutter 12. This shutter is preferably in the form of a simple swingable vane.

A rearward press upon the control button 14 effects swinging of the shutter 12 to open position and causes the finger 37 to close the switch 19. Thus, switch 20 having been previously closed, the exposure is made and a flash is produced. The light from the bulb 11 is concentrated by the reflector 8 upon the area to be photographed, and the illumination is so perfect that the completed photograph will be entirely free from obscuring shadows. Moreover, the photograph will have the desired appearance with regard to depth, instead of having a more or less flat appearance, as often occurs with flashlight photographs.

In the preferred manner of forming the reflector 8, I make use of a bowl-like metal shell 45 having flat rearwardly converging side portions 46 which extend from the front to the rear of said reflector and are disposed in edge-to-edge relation. Lying against the inner sides of these portions 46, are conventional glass mirrors 47 whose front ends are held in metal channels 47' secured to the reflector shell by bolts 48', said mirrors being in edge-to-edge contact, as shown. A rear mirror 48 is also provided, having a central opening 49 in axial alinement with the socket 18, said mirror 48 having flat reflecting surfaces 50, which extend from said opening 49 to the mirrors 47. In the present showing, to obtain the desired angle between the reflecting surfaces 50 and the mirrors 47, to insure the proper concentration of light upon the subject, said reflecting surfaces 50 are somewhat oblique to the longitudinal axis of the reflector 8.

The reflector 48 is preferably formed by a metal plate which is disposed in front of the cells 15, socket 18, switch 19, and the various conductors, and said reflector 48 may well be held in place by studs 51 projecting forwardly from the base 17 through openings in said reflector, and small nuts 52 threaded upon the front ends of said studs. By removing these nuts, the reflector 48 may be forwardly withdrawn for giving access to the cells 15 whenever it is necessary to change the latter.

The insulating base 17 is suitably secured, in the present showing, against the rear end wall 53 of the reflector shell 45, and the operating knob or the like 54 for the switch 20 is accessible at the exterior of said wall 53.

It will be seen from the foregoing that a novel and advantageous structure has been provided for carrying out the desired ends. Not only can the device be readily carried from place to place, but it may be unitarily positioned for use and operated at an instant's notice. The central bulb 11, in its association with the camera and reflecting means, gives ample illumination to attain the best results. This bulb is directly behind the camera 9 and hence is well protected against accidental breakage. Moreover, should the bulb by any possibility explode when it flashes, the camera will protect the subject against flying glass.

The details which I have shown and described have proven desirable in actual operation of the invention and these details may therefore be considered as preferred. However, attention is again invited to the possibility of making numerous variations, within the scope of the invention as claimed.

I claim:

1. A combined camera and illuminator comprising a bowl-like reflector, a photographic camera mounted centrally at the open side of said reflector and having its lens presented away from the latter, and an illuminator mounted centrally within said reflector behind said camera.

2. A combined camera and illuminator comprising a bowl-like reflector, a camera support disposed centrally at the open side of said reflector, said support having radial arms attached to the rim of the reflector to both mount said support and hold said reflector rim against deformation, a photographic camera mounted on said support and having its lens presented away from said reflector, and an illuminator mounted centrally within said reflector behind said camera.

3. A combined camera and illuminator comprising a bowl-like reflector, a photographic camera mounted centrally at the open side of said reflector and having its lens presented away from the latter, a bulb socket mounted in the rear end of said reflector, a flash bulb in said socket and disposed behind said camera, means for supplying current to said socket, said means including a switch, and means under a single control for closing said switch and actuating the camera shutter.

4. A combined camera and illuminator comprising a bowl-like reflector, a photographic camera mounted centrally at the open side of said reflector and having its lens presented away from the latter, a bulb socket mounted in the rear end of said reflector, a flash bulb in said socket and disposed behind said camera, a battery holder, a battery held by said holder, means for completing a circuit from said battery through said flash bulb, said means including a switch, and means under a single control for closing said switch and actuating the camera shutter, all of the aforesaid elements being assembled into a single hand-held unit.

5. A combined camera and illuminator comprising a bowl-like reflector having a plurality of flat rearwardly converging reflecting surfaces at the inner side of its side wall, said reflecting surfaces being disposed in edge-to-edge relation, said bowl-like reflector also having a rear reflector provided with flat reflecting surfaces which radiate to the first named reflecting surfaces, a flash bulb mounted centrally of said rear reflector, a camera mounted directly in front of said flash bulb in fixed relation with the aforesaid elements, and means under a single control for operating the camera shutter and completing a circuit for said bulb, said reflecting surfaces being related to concentrate the light from the bulb centrally in front of the camera.

6. A combined camera and illuminator comprising a bowl-like reflector shell having a plurality of flat rearwardly converging side wall areas extending from the front to the rear of said reflector and disposed in edge-to-edge relation, said reflector shell having a rear end wall connected with its side wall, an insulating base mounted on the front side of said end wall, a bulb socket mounted centrally on the front side of said insulating base, a switch and a battery also mounted on said base, said switch being closable to complete a circuit for a bulb in said socket, flat mirrors secured against the inner sides of said flat side wall areas, a rear mirror in front of said socket, battery and switch and having a central opening co-axial with said socket, said rear mirror having flat reflecting areas extending from said opening to the first-named mirrors, a camera directly in front of and spaced forwardly from said socket, means mounting said camera on said shell, and means under a single control for actuating the camera shutter and closing said switch, said mirrors being related to concentrate the light from the bulb centrally in advance of the camera.

7. In combination with a bowl-like reflector and a fixed-focus photographic camera mounted centrally at the open front thereof, a spacing device pivotally mounted on the front of said reflector, said spacing device being forwardly swingable to a position to abut the subject to be photographed and being rearwardly swingable into compact relation with said reflector.

8. In a device of the character described, a bowl-like reflector, and camera mounting means cooperatively associated with said reflector adapted to secure the camera means in front of and at the open side of said reflector, said camera mounting means extending from the outer periphery of said reflector toward the axial line of said reflector.

9. In a combined camera and illuminator, an internally depressed reflector and camera mounting means co-operatively associated with said reflector for securing a camera in front of and at an open side of said reflector, said camera mounting means including a bracket comprising a body portion and arms rigidly extending outwardly therefrom for connection with the reflector.

10. In a combined camera and illuminator, an internally depressed reflector and camera mounting means co-operatively associated with said reflector for securing a camera in front of and at an open side of said reflector, said camera mounting means including a bracket comprising a body portion and arms rigidly extending radially outwardly therefrom, and engaged with a peripheral edge of the reflector.

11. In a combined camera and illuminator, a reflector having rearwardly converging surfaces, a camera support disposed at an open side of the reflector, said support including radial arms attached to the rim of the reflector for both mounting said support and holding the reflector rim against deformation, a photographic camera mounted on said support and having its lens presented outwardly from said reflector, and an illuminator mounted within said reflector rearwardly of said camera.

12. In a combined camera and illuminator, a reflector having rearwardly converging surfaces, a photographic camera disposed at an open side of said reflector and having its lens presented outwardly from the reflector, a bulb socket mounted in the rear end of the reflector, a flash bulb in said socket and disposed rearwardly of the camera, means for supplying current to said socket, said means including a switch, and means under a single control for closing said switch and actuating the camera shutter.

13. A combined camera and illuminator comprising a reflector shell having a plurality of rearwardly converging reflecting areas extending from the front to the rear of the reflector shell, said reflector shell also having a rear end wall, illuminator means mounted in said end wall, and a camera disposed in front of, and spaced forwardly from, said illuminator.

14. A combined camera and illuminator comprising a bowl-like reflector having an outer peripheral edge, a camera having an optical axis and a plane of aperture, said camera being mounted at the open side of said reflector having its lens presented away from said reflector and having its optical axis passing inside the peripheral edge of the reflector, and illuminator means mounted within said reflector and substantially behind the plane of aperture of the camera, said illuminator means being furthermore so mounted within the reflector in relation to the camera that no direct rays therefrom will pass out of the reflector beyond the plane of aperture of the camera.

ALONZO E. ALDERMAN.